INVENTOR.
JOHN FRANO

BY Alfred E. Miller

ATTORNEY

Jan. 14, 1969　　　　　J. FRANO　　　　　3,421,559
APPARATUS FOR MANUFACTURING HAND RAILS FOR
CIRCULAR STAIRWAYS AND METHOD THEREFOR
Filed Oct. 8, 1964　　　　　　　　　　　　Sheet 2 of 2

INVENTOR.
JOHN FRANO
BY Alfred E. Miller
ATTORNEY

3,421,559
APPARATUS FOR MANUFACTURING HAND RAILS FOR CIRCULAR STAIRWAYS AND METHOD THEREFOR
John Frano, 129 N. Water St., Byram, Conn. 10573
Filed Oct. 8, 1965, Ser. No. 402,552
U.S. Cl. 144—145  5 Claims
Int. Cl. B27c 5/00

The present invention relates to an apparatus for manufacturing sinuous-shaped elongated elements from wood, plastic, metal and other suitable materials. More particularly, the invention is directed to an apparatus for fabricating the handrail of a circular stairway and to the method for producing the same.

An object of the present invention is to manufacture selected sinuous-shaped elongated elements from bar stock of lumber, metal, plastic, etc. by means of a grooved, elongated, shaped, master strip removably attached to the bar stock.

A further object of the present invention is the provision of an apparatus for first generally shaping the object to be manufactured, such as a handrail for a circular stairway, and second to finally shape the object by means of a profiled cutter.

Heretofore, handrails for circular stairways were laboriously hand hewn by expert wood craftsmen. This operation took many hours of work. The present apparatus was evolved in order to reduce the time necessary to manufacture a handrail for a circular stairway to minutes instead of hours. The resultant handrail is of the same or better quality than that of a manual effort.

Therefore, another object of the present invention is to provide a finished handrail for a circular stairway which can be fabricated in a fraction of the time required to carve the same handrail out of a block of wood by hand.

A further object of the present invention is to provide a relatively inexpensive, compact apparatus of small overall dimensions for achieving the desirable result set forth hereinabove.

Figure 1:
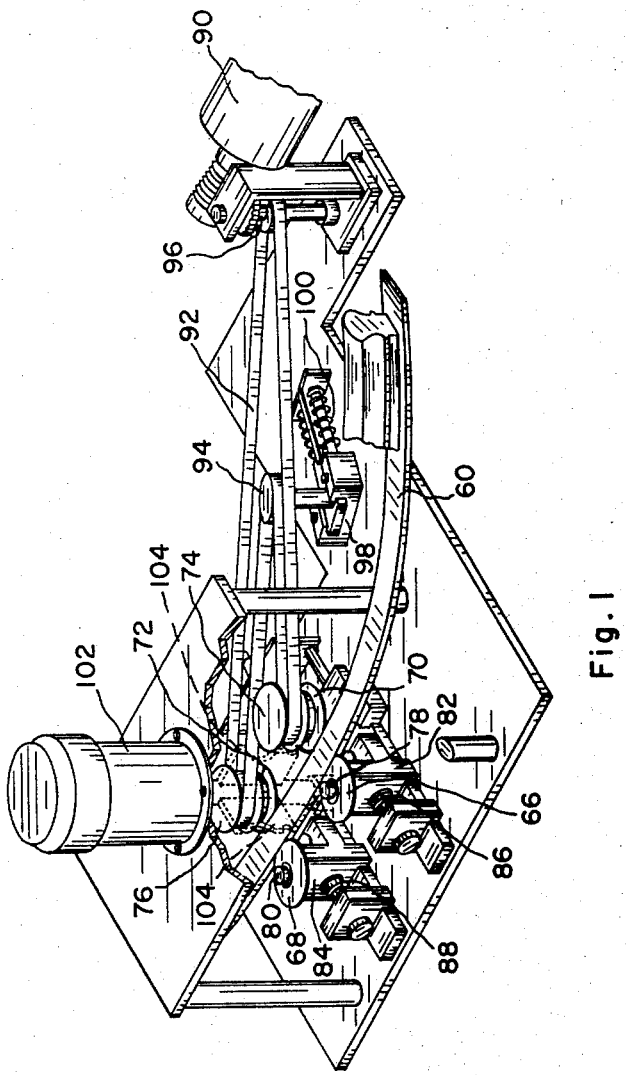

The above and other features, objects and advantages of the present invention will be fully understood from the following description considered in connection with the accompanying illustrative drawings:

FIG. 1 is a perspective view of the second stage of the apparatus constructed in accordance with the teachings of the present invention and illustrating the master strip with handrail thereon.

Figure 2:
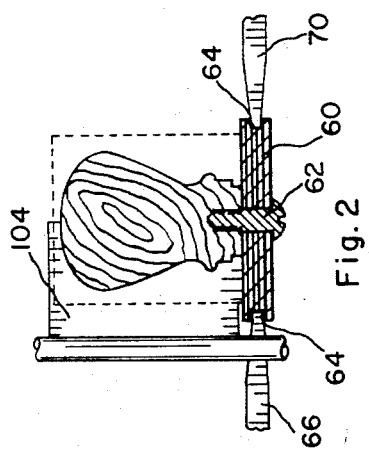
Figure 6:
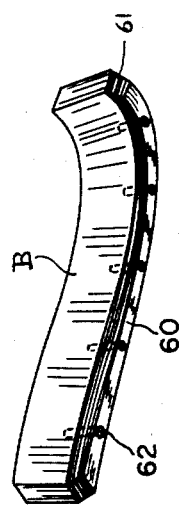
Figure 5:
Figure 4:
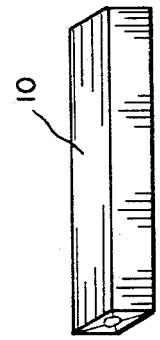
Figure 3:
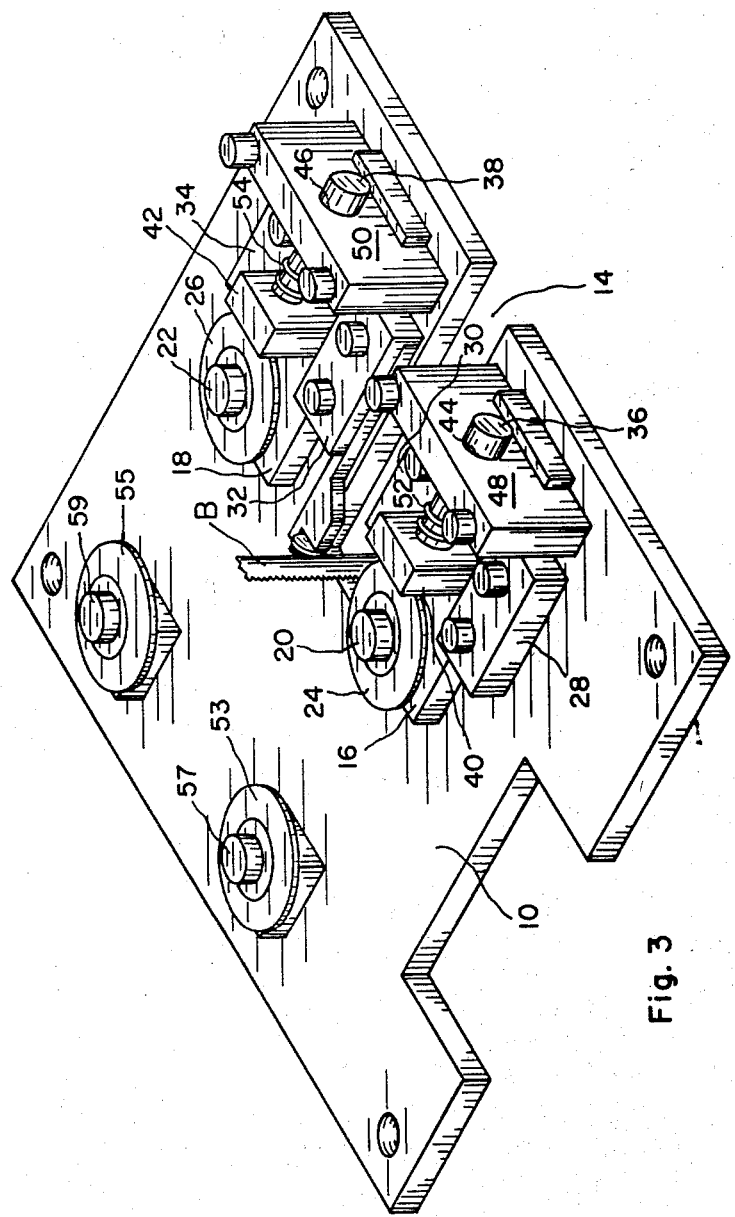

FIG. 2 is a sectional view through the formed handrail and showing part of the rotatable cutter in elevation, FIG. 3 is a perspective view of the first stage of the apparatus in conjunction with a bandsaw, FIG. 4 is a perspective view of the initial bar stock from which, for example, a handrail for a circular stairway is formed, FIG. 5 is a perspective view of the bar stock after the first stage of the operation is completed and the bar stock is shaped into a sinuous form and, FIG. 6 is a perspective view of a master block of the form desired to be reproduced with the laminated master strip secured thereto.

Referring more particularly to the drawings and especially to FIGS. 3–5, a piece of rectangular stock, such as lumber is disclosed in FIG. 4 which bears the reference numeral 10. The lumber 10 is shaped to the desired configuration in two stages. The first stage is performed by the unit illustrated in FIG. 3 while the second stage is performed by the unit disclosed in FIG. 1. These two units must be employed in conjunction with each other in order to fabricate the desired handrail for a circular stairway. Unit I in FIG. 3 is used with a conventional bandsaw, the blade B of which is shown in the slot 14 of the base plate 10. Slidable blocks 16 and 18 support posts 20 and 22. Rotatable on posts 20 and 22 are discs 24 and 26. The blocks 16 and 18 are slidable in guides 28, 30 and 32, 34 respectively. Pins 36 and 38 are fixed at one end in supports 40 and 42 and are slidable through holes 44 and 46 in the end blocks 48 and 50 respectively. Coil springs 52 and 54 surround pins 36 and 38 and are located between support 40 and end block 48 and between support 42 and end block 50 respectively. Thus, the discs 24 and 26 are movable in a plane transverse to the plane of the blade B. Discs 53 and 55 are rotatable on posts 57 and 59 respectively. In operation of the first stage, a block 10 of wood, plastic, metal or any suitable material is removably attached to an elongated master strip 60 preferably by means of screws 62. The master strip 60 has grooves or tracks 64 on opposite edges thereof. The discs 24 and 53 are inserted in the grooves of the master strip and the strip with the block 10 secured thereto is pulled through the unit I. The grooves also engage the rotatable discs 26 and 55 and are pulled through the same. Thus, the discs 24, 26, 52 and 54 serve as guide wheels for the tracks 64 of the master strip. It should be noted that the master strip 60 is inserted into the units first from one end and then from the other end in order to permit the bandsaw blade B to cut the block into the required sinuous form as illustrated in FIG. 5. It should be apparent, therefore, that the sinuous form of the product is caused by the predetermined shape of the master strip 60. After the first stage of the manufacture of the handrail is completed the preliminary shaped handrail is inserted in unit II shown in detail in FIG. 1 of the drawings. The master strip 60 has the grooves or tracks 64 in which the rotatable discs or guide members 66 and 68 ride, as well as the flanges or guide members 70 and 72 of spools 74 and 76 respectively. Discs 66 and 68 are mounted on posts 78 and 80. The aforesaid posts 78 and 80 are secured to slidable blocks 82 and 84, the latter being resiliently mounted by means of coil springs 86 and 88. Spools 74 and 76 are rotated by means of a motor 90 through a belt 92 and pulleys 94 and 96. Pulley 94 is slidably mounted on a sliding block 98 and adapted to move in one direction against the pressure of coil springs 100. A heavy duty motor 102 rotates the special-shaped cutter 104 shown in dotted lines in FIG. 1 and partially illustrated in FIG. 2 in full lines. In this regard, also the master strip is run through the discs 66 and 68 and flanges 70 and 72 with one end thereof leading first and then the master strip is turned around so the other end thereof may be run first through the aforesaid discs and flanges. Thus, first one side of the handrail is shaped to its final form and then the other side of the handrail is shaped to its final form, the resultant configuration in this particular instance being clearly seen in cross-section in FIG. 2. The dotted lines in that figure represent the original block from which the curved and sinuous handrail for a circular stairway is cut.

The master strip 60 is constituted of a plurality of laminated flat strips 61 as seen in FIG. 6, such as a urea and phenol formaldehyde veneer having the trade name "Formica," which are formed on a master block B constructed in the rail form desired to be reproduced. These strips 61 are formed to the shape of the block B and preferably glued together. After the master strip is formed to the desired shape the groves 64 are made therein as seen in FIG. 2.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. An apparatus forming a predetermined sinuous-shaped elongated element from bar stock comprising a single, sinuous-shaped master strip having said bar stock removably secured thereto and having tracks on opposite sides of said strip, said master strip being shaped to correspond to the desired configuration of said sinuous-shaped elongated element, a pair of drive members in one track on one side of said strip, a pair of spaced guide members in another track on the opposite side of said strip and facing corresponding drive members, a cutter-shaped member positioned adjacent to said drive members for cutting said entire sinuous-shaped elongated member in two passes alternately on opposite sides of said bar stock.

2. An apparatus as set forth in claim 1 wherein said spaced drive members are rotatable discs, and said guide members are resiliently movable discs.

3. An apparatus as set forth in claim 2 wherein said movable pair of discs further comprises integral spools thereon, a motor, and a belt drive moved by said motor and driving said spools.

4. An apparatus as claimed in claim 1 wherein said master strip is made of laminated sections, said laminations being glued together.

5. An apparatus as claimed in claim 4 wherein said laminations are constituted of urea and phenol formaldehyde veneer.

References Cited

UNITED STATES PATENTS

| | | |
|---|---|---|
| 1,285,801 | 11/1918 | Rudy. |
| 1,472,510 | 10/1923 | Briddell _____ 144—145 |
| 1,809,488 | 6/1931 | Neale et al. _____ 144—145 |
| 2,474,153 | 6/1949 | Livesay _____ 266—23 |
| 3,139,003 | 6/1964 | Magor _____ 144—144.5 X |

FOREIGN PATENTS 1,056,976   5/1959   Germany.

DONALD R. SCHRAN, *Primary Examiner.*